United States Patent [19]

Koria

[11] Patent Number: 5,342,121
[45] Date of Patent: Aug. 30, 1994

[54] ANTISEPTIC CONTAINMENT FOR BIOHAZARDOUS MATERIAL

[76] Inventor: Brian Koria, 433 S. Seventh St., #2304, Minneapolis, Minn. 55415

[21] Appl. No.: 29,285

[22] Filed: Mar. 8, 1993

Related U.S. Application Data

[63] Continuation of Ser. No. 614,902, Nov. 16, 1990, abandoned.

[51] Int. Cl.$^5$ .............................................. A61G 11/00
[52] U.S. Cl. .................................. 312/1; 600/21
[58] Field of Search ........................... 312/1–5; 135/90, 101, 104, 105, 106; 600/21

[56] References Cited

U.S. PATENT DOCUMENTS

| | | | |
|---|---|---|---|
| 3,051,164 | 8/1962 | Trexler | 312/1 |
| 3,490,443 | 1/1970 | Decupper | 600/21 |
| 3,834,410 | 9/1974 | Leibel | 135/105 |

FOREIGN PATENT DOCUMENTS

| | | | |
|---|---|---|---|
| 0851240 | 10/1952 | German Democratic Rep. | 600/21 |
| 1167603 | 10/1963 | United Kingdom | 600/21 |

*Primary Examiner*—Kenneth J. Dorner
*Assistant Examiner*—Gerald A. Anderson
*Attorney, Agent, or Firm*—Haugen and Nikolai

[57] ABSTRACT

An impermeable barrier and self-contained environment for manipulation, transport and storage of biohazardous materials is disclosed. It is formed of tubular flexible sheeting, opaque or transparent, or a combination thereof, fitted with gloved tubular sleeves and optional iris-type access ports for access to the materials contained within the device. The particular gloves used on the tubular sleeves depend upon the procedures intended. Optional gloves are surgical-quality, examination-quality or heavy-duty. The iris ports for access permit necessary bulky equipment to be passed into the field. The closure of the containment is taped, heat sealed or fitted with a reusable seal such as a ZI-PLOC ® type seal. Optional pouches assist in performing the procedures. A pack of disposable tools or instruments and chemicals such as disinfectants and embalments permit an infectious cadaver to be sealed at the site of an accident, transported to an autopsy site, then transported to a morgue. After autopsy and embalming procedures are completed and all potentially hazardous bodily fluids have been removed and safely stored in containers, the containment may be opened without causing contamination. This is a great improvement over current methods which require disinfection of ambulance, autopsy room and embalming area each time such a procedure is performed on an infectious person. However, the containment is not limited to such use. It has general application to manipulation of any portable hazardous waste materials.

25 Claims, 3 Drawing Sheets

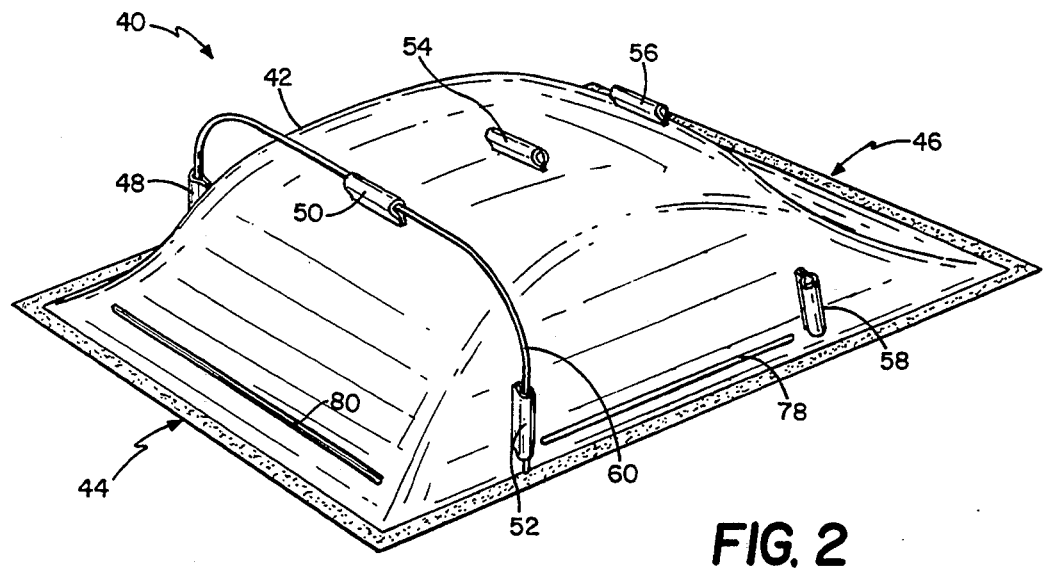
FIG. 2
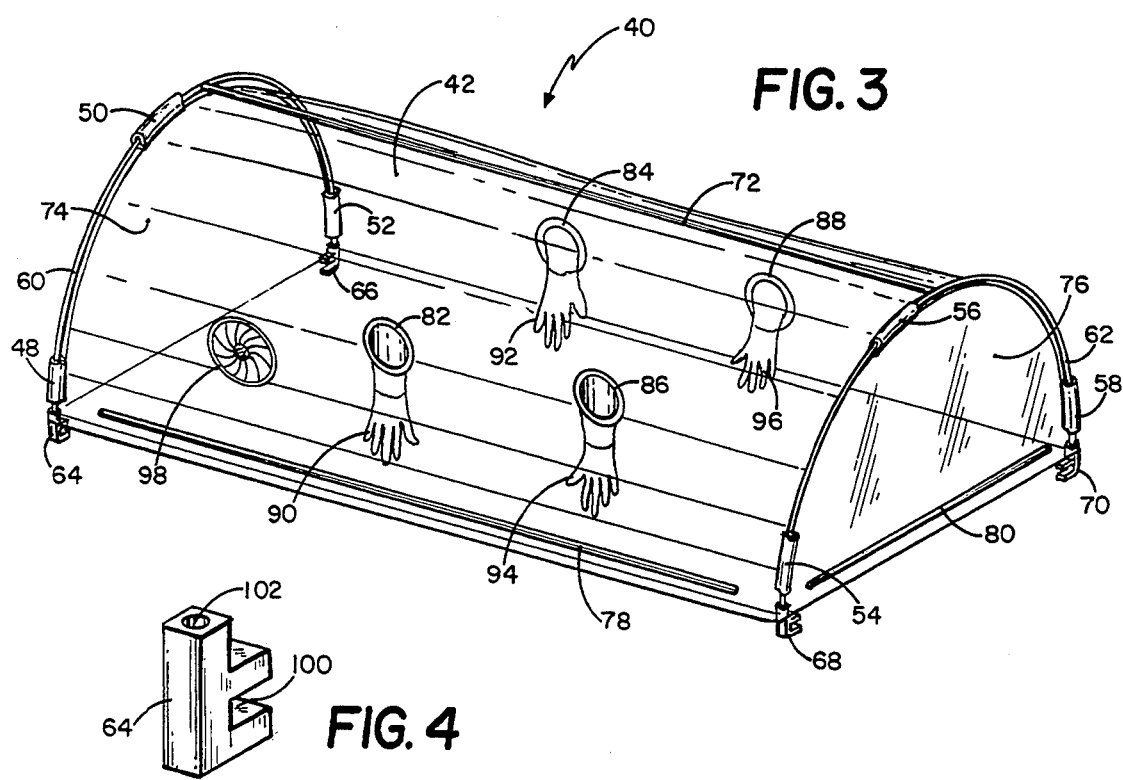
FIG. 3
FIG. 4

ANTISEPTIC CONTAINMENT FOR BIOHAZARDOUS MATERIAL

This is a continuation of copending application Ser. No. 07/614,902, filed on Nov. 16, 1990, now abandoned.

BACKGROUND OF THE INVENTION

I. Field of the Invention

This invention relates generally to the design of sealable plastic containers and more particularly to a barrier and self-contained environment for enclosure of biohazardous materials.

II. Discussion of the Prior Art

Biohazardous material is difficult to handle without creating secondary contamination. Approaches to this problem involve containment of either the material itself or the person handling the material. Particular difficulty is encountered when the material being manipulated is large and infectious, yet requires manipulation with precision. The present invention combines approaches previously taken in hospital incubation equipment and in asbestos removal systems, in order to isolate materials and prevent contamination of the user or the surrounding environment.

The hazards of asbestos removal are well known. Particles are easily air-borne and inhaled. The result may be the devastating disease of asbestosis. For this reason, asbestos is being removed from homes and public areas, but such removal is complicated and costly. FIG. 1a depicts a typical approach to this problem. The material to be removed, such as pipe covering 4, is surrounded with heavy grade flexible plastic sheeting 2, 6 of approximately 6 to 10 mils and taped into place as at 8, 10. Access is possible by what is known in the industry as a HEPA-port. This is a hole 12 in the sheeting that is constructed so as to permit equipment to be passed into the contained region, while limiting the escape of particles. This port may alternatively be fitted with a glove 14. The removal worker stands outside of the clear plastic containment and cuts away the asbestos wrapping on pipes, etc. without worry of inhaling airborne contamination. When the asbestos removal is completed, the sheeting is removed in a way that limits the escape of the particles.

The alternative to containing an object in order to prevent contamination to humans is to contain the uncontaminated human. This problem is encountered in the neonatal ward of a typical hospital. Some babies must be shielded from disproportionate outside contamination or heated to keep them comfortable. They are typically placed in an incubator, shown in FIG. 1b, that is fitted with access ports 18, 20 along the sides and covered with a hard plastic dome 30. These access ports can be sealed with a hard plastic door 22, 24 that can be made to swing to the side to expose an iris-type port 26 once the door latch is opened, all as described in greater detail hereinafter. When the iris is open 28, it is possible to reach into the unit.

An extreme extension of this principle of containment of a human has been its application to protect a boy who was born with a deficient immune system. He was effectively sealed within a "bubble" and lived for over a decade in relative seclusion from outside contamination.

This principle has also been adopted in the fields of asbestos removal, orthopaedic surgery and aeronautics. The appearance of a space suit for extraterrestrial use is well known. A jumpsuit for asbestos removal, shown in FIG. 1c, features a drawstring 32, a zipper closure 33, and elasticized hand holes 34, 35. A similar suit has been devised to protect surgeons from the hazards of airborne viruses and particles while they use instruments that create a fine mist, such as bone saws. This suit, shown in FIG. 1d, features a helmet 36 and surgical gloves 37, 38. Without such protection, it is possible that the mist containing viruses could be inhaled after passing through the standard-issue surgical masks currently provided in most operating rooms. The most significant problem with this approach is that the surgeon remains protected while in the suit, but the remainder of the room becomes potentially temporarily contaminated with particles of bodily fluids as the mist settles.

A similar mist is created by use of bone saws during post-mortem autopsy. In addition to this hazard, there is contamination of instruments by blood and tissue, and the need to absorb escaping fluids as the procedure progresses. This is of particular concern as the number of HIV+ and non-A, non-B hepatitis cases increase. It is the purpose of the present device to provide a way to contain the contaminated field while permitting precision manipulation of the contents.

OBJECTS

It is accordingly a principal object of the present invention to provide a new and improved apparatus for working on biohazardous materials within a closed field.

It is another object of the invention to provide a reliably self-contained environment to eliminate the worry of contamination due to performing necessary procedures on potentially infectious materials.

Another object of the present invention is to provide a means to safely provide access to a contaminated field for performing intricate procedures while maintaining a barrier between contaminated and uncontaminated regions.

A further object of the present invention is to provide a means to permanently seal a contaminated object and odors into a confined space to facilitate safe transport of the contents to a new location.

A still further object of the present invention is to provide a means to contain waste material while performing a refuse inventory for the purpose of compliance with Joint Council for the Accreditation of Hospitals (JCAH) standards.

Yet another object of the present invention is to provide a containment means in which to perform post-mortem autopsies on infectious cadavers in order to prevent the possibility of infection of the pathologists performing the surgery, due to airborne biohazards.

A further object of the present invention is to assist ambulance personnel by providing a containment means for on-site confinement of an infectious person after death while still at the scene of an accident, in order to prevent contamination by contact with potentially infectious bodily fluids.

A further object of the present invention is to provide a means for safe transport of a potentially infectious cadaver between hospital and funeral home.

A further object of the present invention is to provide a means for safely performing embalming procedures within a closed environment in order to prevent contamination by contact with potentially infectious bodily fluids.

SUMMARY OF THE INVENTION

The foregoing objects and advantages of the invention are achieved by providing an impermeable barrier and self-contained environment for manipulation, transport and storage of biohazardous materials. These materials include human cadavers infected with hazardous viruses and bacteria, as well as infectious or otherwise hazardous waste material that must be manipulated, such as refuse counts performed to maintain compliance with accreditation requirements in large institutions. The containment apparatus of the present invention is made of opaque plastic material in order to shield the contents from view. Alternatively, the containment apparatus can be made of transparent plastic material to permit viewing of the contents. It consists of an elongated, flexible plastic sheet having a longitudinal seam extending along the length of the containment and supported by flexible rods.

The containment device is fitted with plastic sleeves onto which gloves are securely attached. The quality of the glove provided is determined by the type of procedure intended. Surgical-quality gloves are provided when surgical or autopsy procedures are to be performed. Alternatively, standard examination-type gloves known in the medical art are provided for procedures which require a limited degree of dexterity or an increased strength of glove. Heavy-duty gloves are also available, for extra protection. Whichever type of glove is chosen, it is securely fitted to the plastic sleeves so that no odor, particles or liquid may escape from the containment device.

The containment device may also be fitted with one or more iris ports. These ports, as known in the design of incubators and the asbestos-removal industry, permit passage of materials and equipment into and out of the confines of the containment apparatus.

The containment device is sealable. As with choice of glove, the manner and location of seal are determined by the procedure to be undertaken. When used at an accident site to contain an infectious cadaver, the closure is either taped shut or it fitted with a ZIP-LOC® sealable closure mechanism. The ZIP-LOC® mechanism is preferred for procedures that require the containment device to be re-opened. When no opening is desired, the containment device is heat sealed to ensure permanent closure without the possibility of leakage.

The containment device is also preferably fitted with pouches and various containers to hold hazardous samples. The pouches are used for sorting of materials, storage of tools, and preventing the containers from moving. The pouches also hold containers of chemicals for use in the procedures desired.

The aforementioned objects and advantages of the invention will become subsequently apparent and reside in the details of construction and operation as more fully hereinafter described and claimed, reference being had to the accompanying drawings forming a part thereof, wherein like numerals refer to like parts throughout.

DESCRIPTION OF THE DRAWINGS

FIG. 2 depicts a perspective view of the preferred embodiment of the present invention;

FIG. 3 depicts a perspective of an alternative embodiment of the present invention;

FIG. 4 depicts the clamp mechanism used in the preferred embodiment;

DESCRIPTION OF THE PREFERRED EMBODIMENT

Figure 1A:
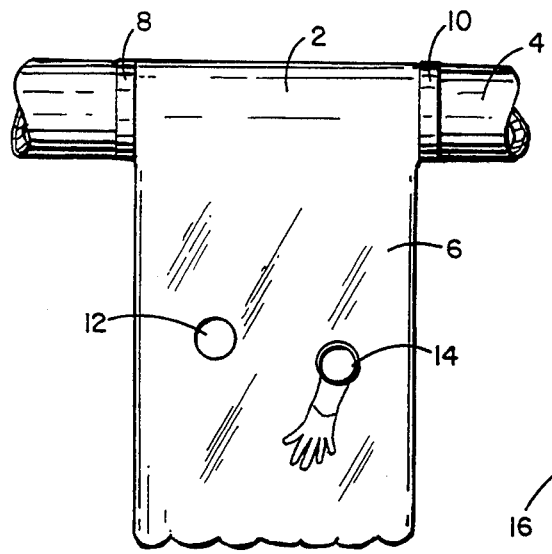
FIGS. 1a through 1d depict prior art approaches to the problem addressed by the present invention.
Figure 1B:
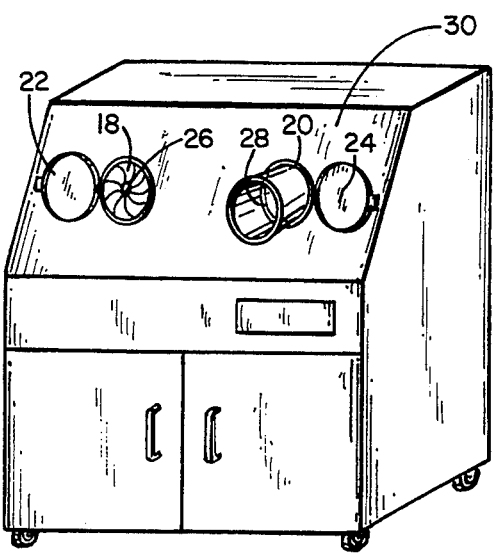
Figure 1C:
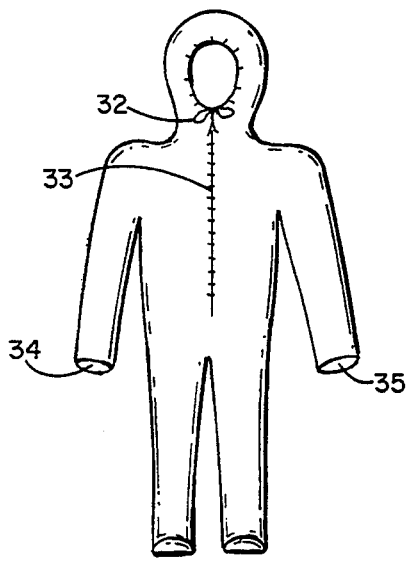
Figure 1D:
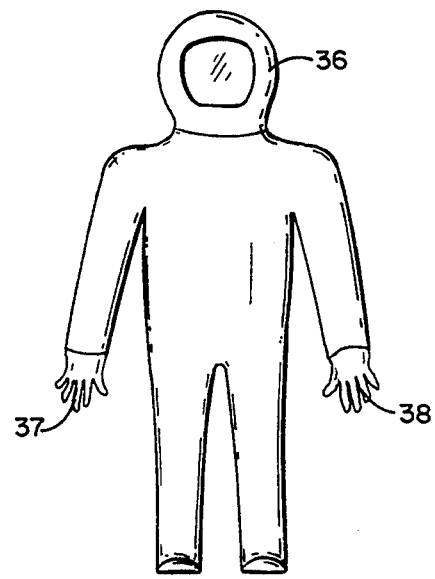

A preferred embodiment of the antiseptic containment for biohazardous material is shown in FIG. 2 and is identified generally by numeral 40. Generally, the apparatus consists of a flexible plastic tube with a flexible frame, gloved access ports, and a sealable opening.

With particular reference to FIG. 2, the present invention is formed of an opaque or transparent material, such as polyethylene plastic sheeting 42. The plastic is sufficiently thick that it will be relatively puncture-proof and will prohibit biological compounds, organisms or odors from passing through it. For example, thickness of 3-15 mils would suffice with the range of 6-10 mils being preferred. This plastic sheeting 42 may be folded about a longitudinal line and heat sealed at the ends (44, 46 of FIG. 2) and along its remaining longitudinal edge (47), like a large bag, or have discrete end panels (74, 76 of FIG. 3) sealed to a tubular-shaped body.

Receiving cuffs or loops 48, 50, 52, 54, 56, 58 of plastic sheeting are located at points approximately one-third, one-half, or two-thirds the length of the containment device for receiving flexible support rods as at 60 therethrough to provide a supporting frame. The flexible support rods 60 thus hold the top layer of plastic sheeting 42 above the plane of an examination table (not shown) upon which the containment device 40 may be placed. The cuffs 50, 52, 54, 56 may be either external or internal to the containment area, as dictated by the procedure for which the device is used.

Referring to FIG. 3, the flexible rods 60, 62 may either be anchored in receiving clamps 64, 66, 68, 70, or set in the ridge formed by the corners of the surface of a commercially-available examination table. Also, an optional longitudinal support rod 72 may span the length of the tubular body 42 for additional support. Receiving clamps 64, 66, 68, 70 are further designed so that they may be snapped around the edge of a surface, such as an autopsy table, for additional security. This eliminates lateral movement.

Receiving clamps 64, 66, 68 70, shown in greater detail in FIG. 4, are formed of a rigid plastic material. They are shaped to snap onto the edge of a typical commercially-available examination/autopsy table, since they have a C-shaped portion 100 of rigid but flexible plastic that adheres to the edge of the table. A leg of rigid plastic extends above this C-shaped section and a hole is bored 102 into this leg to receive the end of the flexible rod 60. This permits the plastic sheeting 42 to be suspended from the flexible rods 60, 62, similar to a tent.

With continued reference to FIG. 3, the ends of the tubular plastic containment device may include flat plastic end panels 74, 76 which are made of the same flexible plastic sheeting, such as polyethylene, as the tubular body 40.

The tubular plastic body 40 contains an opening 78 that may run the length of the plastic sheeting. This permits easy deposit of a cadaver or other hazardous materials within the containment apparatus. Alternatively, an opening 80 may be located at either end (44 or 46 of FIG. 2; 74 or 76 of FIG. 3) and the material to be inspected or otherwise worked on would be slipped into the bag, then the bag would be sealed. The openings 78, 80 feature either a permanent or a semi-permanent seal. For permanent closure, the standard form of heat sealing, as known in the industry, provides an impermeable, leak-proof barrier. For procedures which require a leak-proof seal that permits open access to the interior of the present invention, the standard ZIP-LOC® closure as known in the industry provides an excellent, reliable, re-usable seal. For emergency procedures, such as use by ambulance personnel at the scene of an accident, heavy duty tape, such as duct tape, could be used for temporary closure. Permanent closure using standard heat sealant equipment is also possible.

One or more ports 82, 84, 86, 88 are provided in the sides of the tubular body 40 to provide access to the interior thereof. These may be located wherever desired, including the end panels 74, 76. The number and precise location of these access ports are dictated by the nature of the particular procedure undertaken. These ports may be either fitted with gloved arm sets or with iris ports which permit materials to be passed into the containment device. When ports 82, 84, 86, 88 are fitted with gloved arm sets 90, 92, 94, 96, an operator standing outside of the containment device is able to manipulate the contents within. The gloves 90, 92, 94, 96 are of pliable, chemical-resistant material, such as latex or other material used in the biohazards industry. Alternatively, when it is desired to perform an intricate medical procedure, such as an autopsy, surgical-quality or examination-quality gloves are preferably used.

Figures 5A, 5B, 5C:
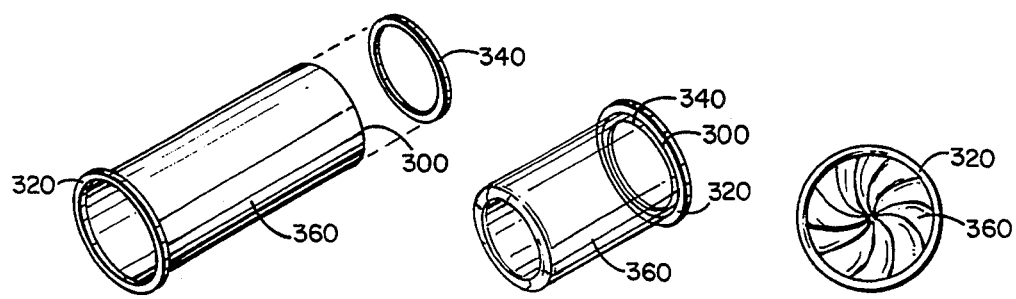
FIG. 5 depicts a blown-apart view of the iris port mechanism.

The iris port, 98 of FIG. 3, is shown in greater detail in FIGS. 5a-c. It consists of an inner reinforcing ring 300 and an outer support ring 320, shown in FIG. 5a, with both mounted on a housing 340. Opposite ends of a sleeve 360 are affixed to the rings 300, 320, so that the fabric of the sleeve 360 is draped between them. As shown in FIG. 5b, the inner ring 300 is mounted on the housing 340, then the sleeve 360 is doubled over so that the outer ring 320 is affixed to the housing 340 and surrounds the inner ring 300. When the rings are opposably rotated, the flexible plastic of the sleeve 360 will twist upon itself until the port closes, similar to the lens of a camera, as shown in FIG. 5c. When the rings are rotated in the opposite direction, the flexible plastic sheet eventually returns to a point where it lays flat upon itself, whereupon the port is wide open, as in FIG. 5b.

Figure 6:
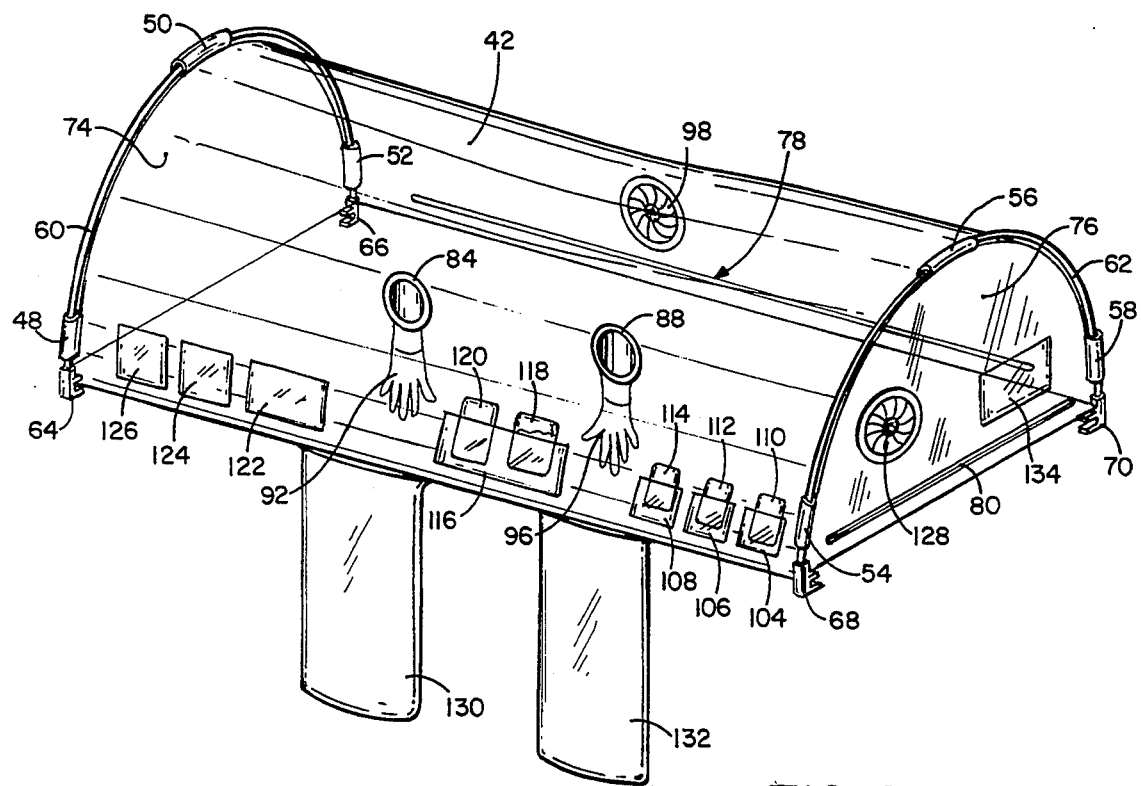
FIG. 6 illustrates optional features available with the present invention.

Turning now to FIG. 6, the basic embodiment may be embellished to fit the needs of the intended procedure. For example, multiple pouches 104, 106, 108, 116, 122, 124, 126, 130, 132, 134 may be provided along the periphery of the tubular body 40 and the end panels 74, 76. The apparatus may be pre-fitted with "bubble" areas or pouches 104, 106, 108 including containers 110, 112, 114 for body tissue and other samples. Containers 110, 112, 114 are either soft-sided, similar to standard plastic or ZIP-LOC® bags, or rigid, similar to TUPPERWARE® containers. Some of these containers are leak-proof, and may be formed of chemical-resistant material to prevent them from dissolving upon contact with chemicals used in the various procedures which may be conducted within this barrier. A tool pouch 116 may be fitted with a container or bag 118 of pre-mixed chemicals for soaking instruments, in addition to the tools or instruments 120 necessary for the particular procedure.

Further supply and chemical pouches 122, 124, 126, 134 are also provided, as necessary, for additional procedures.

In this manner, it is envisioned that an accident victim may be sealed at the site of the accident within the containment apparatus 40, upon the discovery that the body harbors an infectious material. The body may then be transported without contaminating the receiving ambulance or its personnel, and it may be safely transported to the pathology department upon arrival at a hospital. If it is fitted with a tool pouch 116, tools 120 and disinfectant 118, there is no need to unseal the containment apparatus for autopsy. A standard iris port 98, 128 for entry and exit, as known in the industry, may be used for the passage of large equipment and other instruments into the contaminated field. Thus, the fine, moist spray produced by a bone saw, for example, would no longer contaminate the entire room in which it is used. Disinfectant 118 may be used to wipe off such equipment after use, requiring only minimal decontamination after removal through port 128.

Routine autopsies of infectious bodies could also be performed in this closed environment. When the standard pouches are also fitted with tubing, chemicals and other embalming equipment, the body could be transported to the morgue after autopsy, embalmed and prepared for a funeral, without ever needing to open the apparatus until all infectious materials have been safely encased in the containers and pouches.

Refuse may also be deposited in large inverted pouches 130, 132 variously located along the periphery of the bag. The number of such pouches is determined by the intended purpose. Hazardous material, including operating room waste, may be placed inside the containment device of the present invention for various procedures, such as compliance with hospital accreditation-required refuse counts. Refuse may be quickly sorted into the pouches according to its nature. Once the field is clear, the contents of each pouch could be re-deposited into the central field and particle counts could be performed.

It should be apparent to one in the art that various available materials are sufficiently transparent, yet sufficiently nonporous to prohibit exit of vapors or particles from the containment as these procedures are performed. Further, some procedures that do not require or possibly do not permit a totally closed field, such as sterile surgery, could be advantageously performed in this restricted environment, if the closure(s) are not sealed. It is foreseeable that very inexpensive instruments could be included and disposed of along with the bag, but the iris-type access port 98, 128 permits removal if desired. A myriad of variations in port location and pouch nature would tailor a series of minor modifications of the present design to specialized procedures. The arm sets could be fitted with heavy duty gloves, or could be alternatively fitted with surgical-quality or examination-quality gloves to permit greater dexterity, as the particular procedure dictates. It is further envisioned that a transparent window in opaque sheeting is preferred for some procedures.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices and that various modifications, both as to equipment details and operating procedures, can be accomplished without departing from the scope of the invention itself.

What is claimed is:

1. A flexible, self-supportable impermeable containment apparatus forming an enclosed chamber and having an opening for introducing and removing materials, for the storage, manipulation and transport of biohazardous materials, comprising:
(a) an elongated flexible plastic sheet having a longitudinal seam extending along the length dimension thereof for forming said sheet into a tubular enclosure about said biohazardous material, said enclosure having an outer surface and a first and second closed end, an elongated generally planar bottom surface and an elongated curved transparent upper surface extending thereabove, said enclosure including at least one tubular plastic sleeve means for inserting arms therein positioned on said first end, said enclosure further including a pair of coupling members one disposed on each opposing side thereof closely proximate said planar bottom surface;
(b) self-supporting, removable, tubular support means for maintaining said tubular enclosure in an expanded tent-like state by supporting said enclosure curved upper surface at a midsection thereof above said elongated bottom surface to define the enclosed chamber, said self-supporting tubular support means having opposing ends each adapted to couple to one of said enclosure coupling members to further support the enclosure in the tent-like state;
(c) at least one access means for inserting and removing materials, formed through said sheet; and
(d) means for selectively opening and closing said access means.

2. The impermeable containment apparatus as in claim 1 wherein said tubular support means is positioned external to said enclosed chamber.

3. The impermeable containment apparatus as in claim 1, further including at least one said tubular plastic sleeve means for inserting arms therein and said access means for inserting and removing materials positioned along said plastic sheet.

4. The impermeable containment as in claim 1 further including at least one said tubular plastic sleeve means for inserting arms therein positioned on said second end.

5. The impermeable containment as in claim 1, wherein said access means is positioned on said plastic sheet.

6. The impermeable containment as in claim 1 wherein said access means is positioned on at least one of said first and second ends.

7. The impermeable containment apparatus as in claim 1 wherein said access means is sealable.

8. The impermeable containment as in claim 1 wherein said access means is temporarily sealable.

9. The impermeable containment as in claim 1 wherein said access means is resealable.

10. The impermeable containment apparatus as in claim 1 wherein said storage pouch means is attached to the exterior of said containment.

11. The impermeable containment apparatus as in claim 1 wherein said plastic sheet further includes at least one storage pouch means for containing tools and sample containers, said storage pouch means being in the range of 2 mm$^2$ to 3 m$^2$.

12. The impermeable containment apparatus as in claim 1 wherein said plastic sheet further includes at least one storage pouch means for containing tools and sample containers, said storage pouch means being positioned along said plastic sheet.

13. The impermeable containment apparatus as in claim 1 wherein said plastic sheet further includes at least one storage pouch means for containing tools and sample containers, said storage pouch means being positioned on at least one of said first and second ends.

14. The impermeable containment apparatus as in claim 1 further comprising a panel of impermeable flexible sheeting bonded to the perimeter of said first end to form a first end panel.

15. The impermeable containment apparatus as in claim 14 further comprising a panel of impermeable flexible sheeting bonded to the perimeter of said second end to form a second end panel.

16. The impermeable containment apparatus as specified in claim 1 wherein said tubular support means comprises a flexible rod flexed to couple at each said end to each said respective enclosure coupling member and arcuately extending therebetween to support said enclosure in the expanded tent-like state.

17. The impermeable containment apparatus as specified in claim 1 wherein said enclosure includes a pair of said coupling members at each said first and second end of said tubular enclosure, each said pair of coupling members disposed on opposing sides of said enclosure and closely proximate said planar bottom surface.

18. The impermeable containment apparatus as specified in claim 17 wherein said tubular support means comprises a pair of flexible rods, one said rod flexed to couple at each said end to one said pair of opposing coupling members and arcuately extending therebetween to support said enclosure in the expanded tent-like state.

19. The impermeable containment apparatus as specified in claim 16 or 18 wherein each said rod further includes a clip member at each said end which said clip is adapted to be selectively secured to an examination table.

20. The impermeable containment apparatus as specified in claim 16 or 18 wherein each said enclosure coupling member comprises a sleeve integrally formed in said enclosure outer surface for receiving said respective rod therethrough.

21. The impermeable containment apparatus as specified in claim 16 wherein said flexed rod extends closely proximate about said enclosure curved outer surface between said respective enclosure coupling members to define a low-profile apparatus.

22. A flexible, self-supportable impermeable containment apparatus forming an enclosed chamber and having an opening for introducing and removing materials, for the storage, manipulation and transport of biohazardous materials, comprising:
(a) an elongated flexible plastic sheet having a longitudinal seam extending along the length dimension thereof for forming said sheet formed into a tubular enclosure about said biohazardous material, said enclosure having an outer surface and a first and second closed end, an elongated generally planar bottom surface and an elongated curved transparent upper surface extending thereabove, said enclosure having at least one iris-type access port formed through said sheet, said port being surrounded by a first end of a tubular shaped flexible plastic sleeve sealed about the perimeter of said port, the sleeve being of a predetermined length and having a retaining ring sealed to the second end of said sleeve, such that when said flexible plastic sleeve is folded over upon itself, said retaining ring holds said sleeve flush upon itself and flush with said port, and when said retaining ring is rotated with respect to said port and said first end, said flexible plastic sleeve twists and folds over upon itself, said enclosure further including a pair of coupling members one disposed on each opposing side thereof closely proximate said planar bottom surface;

(b) self-supporting, removable, tubular support means for maintaining said tubular enclosure in an expanded tent-like state by supporting said enclosure curved upper surface at a midsection thereof above said elongated bottom surface to define the enclosed chamber, said self-supporting tubular support means having opposing ends each adapted to couple to one of said enclosure coupling members to further support the enclosure in the tent-like state:

(c) at least one access means for inserting and removing materials, formed through said sheet; and (d) means for selectively opening and closing said access means.

23. A flexible, self-supportable impermeable containment apparatus forming an enclosed chamber and having an opening for introducing and removing materials, for the storage, manipulation and transport of biohazardous materials comprising:

(a) an elongated flexible plastic sheet having a longitudinal seam extending along the length dimension thereof for forming said sheet formed into a tubular enclosure about said biohazardous material, said enclosure having an outer surface and a first and second closed end, an elongated generally planar bottom surface and an elongated curved transparent upper surface extending thereabove, said enclosure including at least one port formed through said sheet, said port being surrounded by a first end of a tubular shaped flexible plastic sleeve sealed about the perimeter of said port, the sleeve being of a predetermined length and having a glove member sealed to the second end of said sleeve, said enclosure further including a pair of coupling members one disposed on each opposing side thereof closely proximate said planar bottom surface;

(b) self-supporting, removable, tubular support means for maintaining said tubular enclosure in an expanded tent-like state by supporting said enclosure curved upper surface at a midsection thereof above said elongated bottom surface to define the enclosed chamber, said self-supporting tubular support means having opposing ends each adapted to couple to one of said enclosure coupling members to further support the enclosure in the tent-like state;

(c) at least one access means for inserting and removing materials, formed through said sheet; and (d) means for selectively opening and closing said access means.

24. The impermeable containment apparatus as in claim 23 wherein at least one of said ports and at least one tubular plastic sleeve for inserting arms therein are positioned along said longitudinal tubular sheeting.

25. The impermeable containment apparatus as in claim 23 wherein at least one tubular plastic sleeve for inserting arms therein may be positioned on said first end and said second end.

* * * * *